(12) United States Patent
Ene

(10) Patent No.: US 11,170,378 B2
(45) Date of Patent: Nov. 9, 2021

(54) METHODS FOR PAYMENT AND MERCHANT SYSTEMS

(71) Applicant: Cosmin-Gabriel Ene, Munich (DE)

(72) Inventor: Cosmin-Gabriel Ene, Munich (DE)

( * ) Notice: Subject to any disclaimer, the term of this patent is extended or adjusted under 35 U.S.C. 154(b) by 686 days.

(21) Appl. No.: 15/806,945

(22) Filed: Nov. 8, 2017

(65) Prior Publication Data

US 2018/0068310 A1 Mar. 8, 2018

Related U.S. Application Data

(60) Continuation-in-part of application No. 14/283,885, filed on May 21, 2014, which is a division of application No. 13/394,485, filed as application No. PCT/EP2010/005435 on Sep. 3, 2010, now abandoned.

(30) Foreign Application Priority Data

Sep. 8, 2009 (DE) .......................... 102009040575.5
Oct. 28, 2009 (DE) .......................... 102009050985.2

(51) Int. Cl.
G06Q 20/40 (2012.01)
G06Q 20/24 (2012.01)
G06Q 20/10 (2012.01)
G06Q 20/12 (2012.01)
G07G 1/14 (2006.01)

(52) U.S. Cl.
CPC ......... *G06Q 20/405* (2013.01); *G06Q 20/102* (2013.01); *G06Q 20/12* (2013.01); *G06Q 20/24* (2013.01); *G06Q 20/40* (2013.01); *G07G 1/14* (2013.01)

(58) Field of Classification Search
CPC ...................................................... G06Q 20/24
See application file for complete search history.

(56) References Cited

U.S. PATENT DOCUMENTS

| | | | | |
|---|---|---|---|---|
| 7,720,762 | B1 * | 5/2010 | Rolf ....................... | G06Q 40/00 705/42 |
| 7,766,244 | B1 * | 8/2010 | Field .................... | G06Q 20/357 235/493 |
| 2002/0055848 | A1 * | 5/2002 | Jae ........................ | G07F 19/211 705/1.1 |
| 2002/0165821 | A1 * | 11/2002 | Tree ....................... | G06Q 20/04 705/39 |
| 2010/0293065 | A1 * | 11/2010 | Brody ................. | G06Q 20/3223 705/26.1 |

* cited by examiner

*Primary Examiner* — Jay Huang

(57) ABSTRACT

Methods for payment and/or merchant system which facilitates the payment of very small monetary amounts, making the payment more secure for the user. The method for a payment system for at least one online shop relies on an identifier of a user device for recording at least one identification number of the user device, for receiving and confirming direct debit orders, and for storing the direct debit orders. Such method monitors the total of the debit amounts in relation to the identification number and to request a user of the user device to register after a predetermined time interval and/or on exceeding a predetermined value of the total payable, in order to settle at least part of the total payable.

9 Claims, 2 Drawing Sheets

Fig. 1
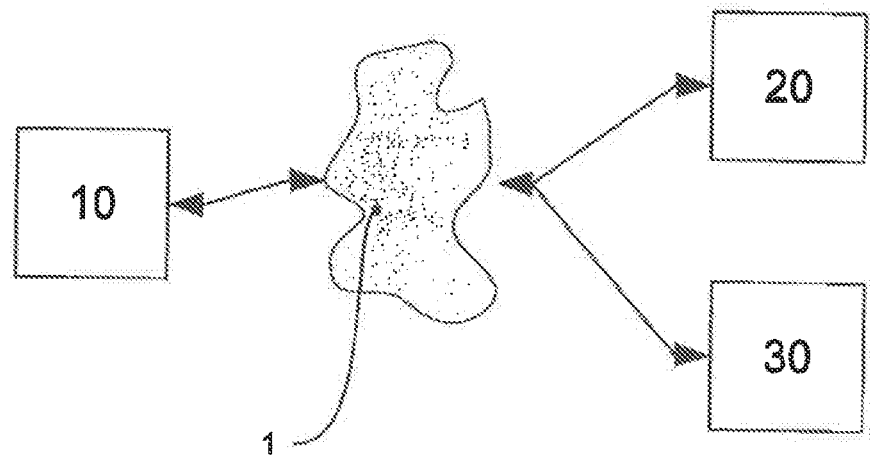
Fig. 2
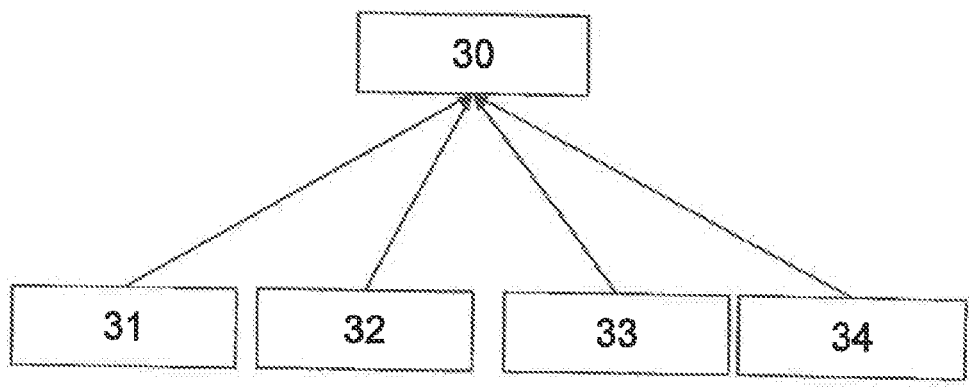
Fig. 3

METHODS FOR PAYMENT AND MERCHANT SYSTEMS

CROSS-REFERENCE TO RELATED APPLICATIONS

This application is a continuation-in-part of U.S. application Ser. No. 14/283,885 filed May 21, 2014, which is a divisional of U.S. application Ser. No. 13/394,485 filed Mar. 6, 2012, now pending, which is a U.S. national phase of PCT Application No. PCT/EP2010/005435 filed Sep. 3, 2010, which claims priority to DE 102009050985.2 filed Oct. 28, 2009 and DE 102009040575.5 filed Sep. 8, 2009, the disclosures of which are hereby incorporated in their entirety by reference herein.

DESCRIPTION

Shopping systems are known wherein a plurality of web servers is mutually connected via a network, usually the internet, in order to enable a purchaser to purchase goods and/or services. Conventionally, the customer selects a particular virtual marketplace, seeks goods and services there, places them in a virtual shopping trolley and pays for the items at the end of the shopping procedure. The payment procedure is usually very complex, since it is necessary for the individual user or purchaser to be sufficiently authenticated. For this purpose, the name and address are usually requested. For the payment transaction, the user must enter account or credit card information which enables debiting of the payable amount. The process of registration, that is, input of name and address and/or account or credit card information is complex. A main problem lies therein that with small amounts from a few cents to a Euro (£0.01 to £1.00), customers are reluctant to register at all. The effort involved in order to obtain goods or information for a few cents on the market place is too great and is out of proportion to what is being purchased. Thus for payments in the region of under £1, there is no actual market, since it cannot come into existence due to the effort-to-reward ratio.

Additionally, the individual users would like to ensure that their data will be treated confidentially. Usually, users will only disclose their information when they trust the marketplace in question. It is therefore difficult for small businesses to establish such marketplaces or online shops.

For the monetary processing of purchases, service providers have now become established which offer payment systems with which one needs only to register once, in order then to be able to carry out corresponding payment transactions in numerous online shops via one such service provider. The registration for such central payment systems is again very complex. Furthermore, such a payment transaction incurs costs which, inter alia, the online shops must bear.

It is apparent overall that the obstacles and starting thresholds associated with such a purchase on the interne are so numerous and high that potential purchasers are often deterred from making such a purchase. This applies, in particular, for goods and services for the purchase of which only very small sums are involved. It is extremely problematic, for example, to demand full registration of a user in order to view a one-page test report which costs about 50 cents.

Proceeding from this state of the art, it is an object of the present invention to provide a payment system which ensures a secure payment transaction. It is also intended to provide a corresponding shopping system and a method for performing a plurality of payment transactions.

In particular, the aim is achieved with a payment system for at least one online shop, such as a network-accessible merchant, wherein the payment system comprises: an identification device for recording at least one identification number of a shopper system; an interface device for receiving and confirming direct debit orders from the at least one online shop, wherein the debit orders comprise information relating to a debit amount, i.e., price, to be paid to the online shop; a memory device for storing the direct debit orders in conjunction with the associated identification numbers; a processing device which is configured to monitor the total of the debit amounts in relation to the identification number and to request a user of the shopper system to register after a predetermined time interval and/or on exceeding a predetermined value of the total payable, in order to settle at least part of the total payable.

An essential concept of the present application lies therein that the payment system records a purchase made by a user in the form of a direct debit order. The payment system also stores identification information which enables the preferably unique identification, i.e., identifier, of the shopper system used. Initially, therefore, no information is requested regarding the user of the shopper system. Theoretically, any user could carry out shopping and payment transactions with the shopper system.

Once a predetermined time interval has passed and/or a predetermined value of the total payable has been exceeded, the payment system requests the user to register in order to pay at least part of the total payable. The user can thus meanwhile shop entirely anonymously and completely secure against fraud. The individual purchases are associated with the shopper system used by him, for example, a user device such as a PC or a mobile communication device. Only once a predetermined period has elapsed or a predetermined total payable has been amassed, does the user have to disclose his identity or at least input information which enables settlement of the debt The payment system lowers to a minimum the entry threshold for chargeable content on the interne, since it enables the user to consume now and pay later. The user can accumulate a plurality of very small payable amounts (micro payments) and then pay these as soon as a relevant amount has accumulated. This also saves technical resources, since the associated measures do not have to be performed for every minimal payment transaction. Furthermore, a new market can be accessed with the payment system, such as the market which deals with payments characterised by very small monetary amounts (e.g. smaller than £1).

The payment system according to the invention can also make the processing of small payments economical. The minimum debit handling charges of banks are sometimes multiple times higher than the value of the content purchased (e.g. on average £0.20 per transaction). The payment system according to the invention can serve as a global shopping trolley (e.g. over a plurality of web sites) and can aggregate purchases. These are then settled cumulatively, thus reducing the relative charges per transaction to a minimum. The direct debit transaction is processed only once for e.g. 20 purchases, reducing the incidental costs incurred for performance of the direct debit. The processing device can be configured such that, until registration, said system does not request any personal data and, in particular, no payment information from the user of the shopper system prior to sending a system of the online shop an authorization signal representing that the payment system does not perceive the shopper system as uncreditworthy.

The memory device can be configured such that, until registration, said device stores the direct debit orders exclusively with reference data relating to the shopper system.

The identification device can provide a program which can be executed on the shopper system to record the at least one identification number. The communication protocol itself often enables the recording of a suitable label, which preferably uniquely identifies the shopper system. However, a program which reads or generates a suitable identification number to identify the shopper system and can be executed on the shopper system is preferably provided.

The interface device can comprise a blacklist of identification numbers and can be configured such that said device refuses direct debit orders relating to an identification number contained in the blacklist, whilst the processing device can be configured to store in the blacklist identification numbers of shopper systems the users of which do not register after the predetermined time interval and/or on exceeding the predetermined total payable to settle the total payable at least partially. It is therefore possible for the present payment system to exclude persons or users who are bad payers and thereby minimise the resulting loss. Since the payment system according to the invention is preferably used for settling very small debit amounts, the financial risk is very slight.

The stated problem is also solved by a shopping system which comprises a plurality of online shops and at least one payment system as previously described.

The shopping system can comprise at least one online shop, such as a network-accessible merchant, with a system such as a web server, to provide, for example, an HTML-based sales portal, wherein at least one object is embedded in the sales portal for processing debit orders and has a communication link to the payment system. An interaction between the online shop and the sales portal is therefore possible without the user having to instigate additional measures for this purpose. The online shop embeds a suitable object, i.e., executable software code, in the internet presence of said shop, i.e., the software code, such as HTML code, for providing the online shop's webpage(s), and handles the payment processes via the object, which communicates with the payment system The embedded object can be configured for outputting information regarding the payment system, particularly a payment demand and/or an account balance. The user needs therefore to make no further effort to view his account balance with the payment system. The relevant information is presented as part of the internet presence of the individual online shops. In the event, also, that the payment system wishes to send out information to the user, the payment system does not need to take any active steps. Rather, the occasion when the user, using his shopper system, visits an online shop communicating with the payment system can be awaited. In this event, the online shop issues suitable information for the payment system to the user of the shopper system.

The stated problem is also solved by a method for carrying out a plurality of payment transactions, wherein the method comprises: storage of an identification number of a shopper system, user device, by means of which a purchase is transacted in an online shop in the amount of a particular purchase sum, storage by a payment system of the purchase sum, e.g., price, in conjunction with the identification number, monitoring by the payment system of the total payable from the purchases transacted by means of the shopper system transmitting an authorization signal to the merchant system, and issuing, to a user of the shopper system, of a request for settlement of at least part of the total payable when said total payable exceeds a predetermined value and/or after a predetermined time interval has elapsed.

The method also has similar advantages to those set out in connection with the payment system.

The method can comprise registration of a user following issuing of the request. Therefore, unlike the conventional system, there is no immediate registration for settlement of each purchase sum. Rather, the payment system accumulates purchase sums over a relatively long time period and then, only later, requests settlement.

Registration can comprise the recording of bank account and/or credit card information.

The aforementioned identification number can be a hardware identification number. It is preferably a hardware identification number of the shopper system. Such identification numbers are a fixed component of conventional shopper systems and can be used for the unique identification thereof. It is also relatively complex to amend such numbers such that the payment system according to the invention is deceived.

The hardware identification number can comprise at least part of an MAC (Media-Access-Control) address and/or a processor identification number and/or a hard disk identification number and/or an IP address and/or other unique device numbers, e.g. the Unique Device Identifier (UDID) of a Smartphone.

The identification of the shopper system can take place using just the hardware identification number. Optionally, other mechanisms can be provided to identify the user and/or the shopper system. For example, a 'local shared object' can be placed on the shopper system. This object can be a Flash cookie. In order to secure this identifier against falsification, the object can be digitally signed. The signature can be realised by means of a certificate from a Public Key Infrastructure (PKI).

The time interval can be, for example, greater than 10 days and/or greater than 1 month and/or greater than three months. Preferably, the time interval is calculated from the entry or execution of a first debit order in relation to a particular identification number onwards.

Further embodiments are disclosed in the sub claims.

The invention will now be described in greater detail using several exemplary embodiments and making reference to the drawings, in which:

FIG. 1 shows a shopping system comprising a shopper system, an online shop and a payment system;

FIG. 2 shows the individual components of an exemplary embodiment of the payment system of FIG. 1;

FIG. 3 shows exemplary database entries of the payment system of FIGS. 1 and 2.

Figure 4:
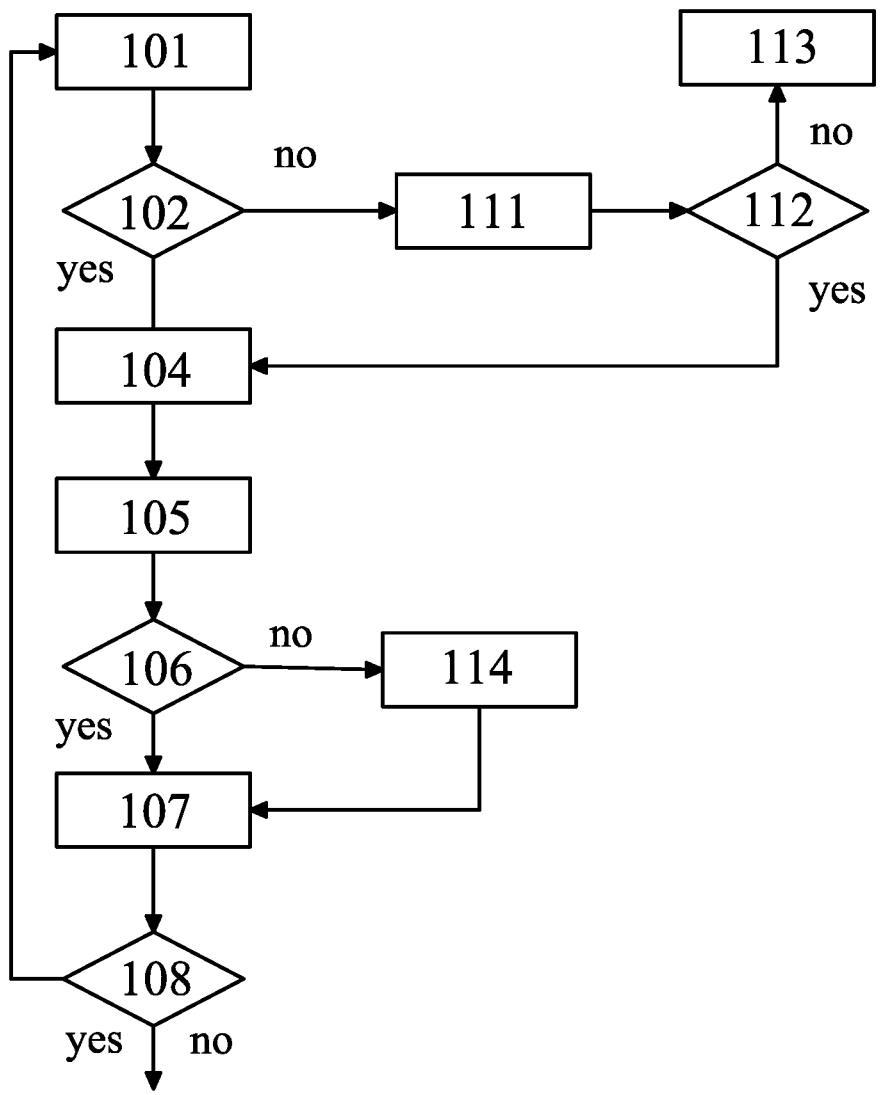
FIG. 4 shows a flow diagram of an exemplary order-making process according to the invention.

In the following description, the same reference signs are used for the same and similarly acting parts.

FIG. 1 shows the shopping system according to the invention. Herein a shopper system 10, for example, a user device such as a laptop, a PC or a mobile terminal is connected via a network, in the present case the internet 1, to an online shop 20 such as, for example, a network-accessible merchant. The online shop 20 and the shopper system 10 are also in communicative connection, via the internet 1, with the payment system 30. Normally, numerous other systems are connected to the interne 1.

FIG. 2 shows individual components of the payment system 30. The payment system 30 according to the invention has an identification device 31 for recording at least one identifier, i.e., identification number of the shopper system 10, an interface device 32 for receiving and confirming direct debit 6 orders from the online shop 20, wherein the debit orders comprise information relating to a debit amount to be paid, i.e., purchase price, to the online shop 20, a memory device 32 for storing the direct debit orders in conjunction with the associated identification numbers ID and a processing device 34 for processing the incoming payment transactions.

The individual devices will now be described in greater detail by reference to the flow diagram in FIG. 4. An exemplary embodiment of a purchase processed by the payment system 30 according to the invention proceeds as follows:

A user enters particular interne addresses into the shopper system 10 operated by him, in the browser running therein. The browser establishes contact with the server(s) of the online shop 20 and represents an internet presence of the online shop 20. This internet presence contains an embedded object which is in communicative connection with the interface device 32 of the payment system 30. The payment system 30 can therefore record an identification number ID of the shopper system 10 by means of the embedded object. In the present case, for example, this is an MAC address of the shopper system 10. Thus, as made clear in step 101 of FIG. 4, the MAC address of the shopper system 10 is recorded.

It is subsequently checked whether the shopper system 10 is creditworthy (step 102) by, for example, determining a creditworthiness indicator. Such determination may be made by, for example, the payment system 30, and particularly the processing device 34, determining whether an account exists for the received MAC address, if a corresponding account exists, it is determined whether debit amounts have already been added to this account. If this is the case, the individual debit amounts are totaled. If the debit amounts do not exceed a predetermined amount (e.g. £3), or if the oldest debit order was incurred more than a predetermined time period ago, for example, three months, a creditworthiness indicator is generated satisfying a predetermined condition enabling the payment system 30 to transmit an authorization signal to the online shop 20 indicating that it is user to continue with its purchase (step 104).

However, if the debit amounts exceed the predetermined amount (e.g. £3), or if the oldest debit order was more than a predetermined time interval, for example, three months ago, the user of the shopper system 10 is requested to settle the added debit amounts (step 111), if the user pays the outstanding total payable (step 112), the creditworthiness indicator is generated satisfying the predetermined condition enabling the payment system 30 to transmit an authorization signal to the online shop that enables the user to continue with its purchase (step 104). Otherwise, the creditworthiness indicator is generated that would not satisfy the predetermined conditions and no authorization signal would be transmitted by the payment system 30 to the online shop 20, i.e., alerting the online shop 20 to deny the user for its requested purchase (step 113).

Moreover for determination of the creditworthiness indicator, the payment system 03 may additionally verify whether the identifier of the shopper system 10 is included in a maintained blacklist of identifiers of user devices which, for example, do not register after the predetermined time interval and/or exceed the predetermined total payable without settlement. Such blacklist may include user identifiers of shopper systems for other reasons including, for example, such identifiers represent stolen user devices, devices located or originated from outside of a specific territory or an embargoed country or region.

Accordingly, if the creditworthiness of the shopper system 10 is acceptable, the transmitted authorization signal alerts the online shop 20 that the user can make the requested purchase by means of the shopper system 10 (step 104). For example, a chargeable review of a cinema film or other digital content can be accessed. In another exemplary embodiment, the user can be enabled to undertake a telephone call over the internet 1, or activate or reserve a variety of other services.

In connection with completion of the purchase, for example, the online shop 20 passes the associated booking in the form of a direct debit order to the payment system 30, particularly to the interface device 32 (step 105). In step 106, it is checked whether an account already exists for the shopper system 10. In effect, it is determined whether an account has already been established by the payment system 30 for the read-out MAC address. If no account exists, a suitable account is established (step 114). In step 107, the payment system 30 (in particular the memory device 33) stores the direct debit order in conjunction with the MAC address. An entry which gives information about which purchases have already been transacted with the recorded MAC address is therefore added to the created account.

The user of the shopper system 10 can then decide whether he wishes to undertake more purchases (step 108). If the user wishes, he can call up a further internet presence of a further online shop 20 by input of a further internet address. Then the recording of his MAC address is carried out once again and this is then passed on to the payment system 30 (step 101).

As the above exemplary embodiment makes clear, initially, the payment system 30 records the individual direct debit orders as anonymously as possible. The payment system 30 confirms each debit order to the online shop 20, such as by, for example, an authorization signal, so that the online shop 20 can essentially assume a completed payment. The payment system 30 can identify the shopper system 10 based purely on the MAC address.

The memory device 33 thus stores the direct debit order in conjunction with the corresponding MAC address. For this purpose, the payment system 30 comprises a corresponding database in which corresponding tables are kept. An exemplary extract from a table kept therein is shown in FIG. 3. Said table comprises, for example, three columns, specifically a first column which contains the identification of a particular direct debit order, a second column which contains the amount to be debited and a third column which contains the date on which the direct debit order was received by the payment system 30. Each line of the table in FIG. 3 corresponds to a direct debit order. Thus, it is possible to read from the table in FIG. 3 that on Jan. 7, 2009, 20 Eurocents were debited for identification number 222. Furthermore, on 20 Sep. 2009, 5 Eurocents were debited for the same MAC address.

The processing device 34 can use these entries to determine the total payable from the debit amounts for particular identification numbers ID. For example, the total payable for identification number 222 comes to 25 Eurocents.

Thus, the payment system 30 can be configured, for example, so that a user of a shopper system 10 has to settle his debts when they are greater than £1. Accordingly, in step 102 it is checked, for the user of the shopper system with the identification number 222, whether the total payable already amassed by said system is greater than £1. Since this is not the case in the exemplary embodiment shown in FIG. 3, the creditworthiness indicator is generated satisfying the predetermined condition enabling the payment system 30 to transmit an authorization signal to the online shop 20 to enable the user to make further purchases without having to settle his debts.

In the exemplary embodiment described above, in step 102, it is checked whether the shopper system 10 has already amassed a total payable that is greater than a particular value (for example, £1). In addition, the processing device 34 can check in step 102 whether the user of the shopper system 10 has used the payment system 30 for longer than a particular predetermined time interval. For example, the processing device 34 can check whether the first direct debit order of a particular identification number ID is older than 3 months. The payment system 30 can be configured such that in this case, an immediate demand for settlement of the outstanding amounts is issued.

The payment system 30 can also be configured such that said system offers the user the possibility to settle his amassed direct debit orders at any time. Preferably, the user is encouraged, by the offering of rebates, to make his actual payment to the payment system 30 at as early a time point as possible.

The payment system 30 can also comprise an account monitoring device which monitors actual incoming payments, and credits them to a shopper system 10. For example, a registration according to the invention can take place therein that the user enters a user name. In exchange, the payment system 30 shows him an account number and requests him to transfer the total payable to the corresponding account, stating his user name. The transferred amount is then credited to the account of the shopper system 10 used by him.

In a further exemplary embodiment, the user name or a payment reason reference is automatically generated. The user therefore remains as anonymous as possible.

In another exemplary embodiment, the user can input address data and his actual name and, together with these data, enter his account number, so that the payment system 30 can debit the direct debit orders amassed in the past. The entries can also be used to perform future direct debit orders either in the short term or in the form of a batch debit at the end of a month, a quarter, or a year.

In the exemplary embodiments described above, an MAC address was used to identify the shopper system 10. It should be obvious for a person skilled in the art that, in place of the MAC address, he can use an IP address, an identification number of an operating system, an identification number of a processor or other identification numbers that give access to the identity of the shopper system 10. It is also theoretically possible to use a plurality of these identification numbers ID in order to increase the reliability of the payment system 30. Furthermore, it is possible to use just parts of said identification numbers to generate a unique key which identifies the shopper system 10.

Also, the payment system 30 may be configured to additionally receive from the online shop 20 information regarding the requested item for purchase by the shopper system 10, and further evaluate whether the user device has previously been provided access to such requested item.

In the exemplary embodiment according to FIG. 1, a shopping system is defined with only one shopper system 10 and only one online shop 20. Usually a plurality of shopper systems 10 access one online shop 20. Furthermore, a plurality of online shops 20 is present, which use one or more payment systems 30 according to the invention.

Exemplary embodiments have been described above wherein identification of the shopper system 10 is directed to a particular identification number ID which gives an MAC address, an IP address, an identification number of an operating system, an identification number of a processor or other identification numbers which give access to the identity of the shopper system 10, or comprises parts thereof. It is possible to undertake a combination of the methods. Therefore different identification numbers ID, relating, for example, to an MAC address or an IP address or an identification number of a processor can be requested. Finally, the identification numbers ilk which are provided by the shopper system 10 are used.

It is also possible to request individual identification numbers ID according to a sequence. This sequence can be based on the probability with which a particular shopper system 10 provides the numbers or the character string. Thus the payment system 30 can first search for an MAC address. If this cannot be determined, then the processor identification number, or the like, is requested. It is also conceivable for a cookie to be set.

The user can thus be uniquely assigned a database by means of a digitally signed cookie. The signed data can comprise a combination value formed from all the previously known user data in order to make misuse more difficult. The cookie can be stored using a plurality of techniques on the shopper system 10 (e.g. as a HTTP or Flash Cookie) and thus, as far as possible, be secured against later deletion. If, on a later contact with the payment system 30, the cookie is deleted in a cookie store, it can be created anew. The cookie can also comprise a parameter which states whether the user is already registered or logged in. The user can log into an interface of the payment system 30 at any time in order to inspect his account information.

In a further embodiment of the invention, the payment system 30 can use a code provided by the user in order to identify himself to the payment system. The code can serve as an identification number ID and be used in place of a hardware identification number, for example, the MAC address, of the shopper system 10. It is also conceivable that the code input for the above-mentioned identification numbers ID, for example, a requested hardware identification number, is used.

The code can be, for example, an IMSI (International Mobile Subscriber identity). The user of the shopper system 10 enters the IMSI of his mobile telephone and the payment system 30 establishes an account relating thereto or adds the debit amounts to the existing account. The payment system 30 can verify the correctness of the code given that is, the IMSI in that said payment system sends a message, for example, by SMS (Short Message Service) to the relevant mobile telephone. The payment system 30 can then request the user to confirm receipt of the message, for example, by returning the message or input of a code, wherein use of the payment system 30 is prohibited if the message is not confirmed. Said verification can only take place once, preferably on establishment of the account, or at every payment transaction.

In order to minimise as far as possible the risk of non-paying users (for example: a user uses the payment system 30 until he is requested to settle his debts. He then tails to settle his debts, but dispenses with further use of the payment system 30), the payment system 30 can comprise an evaluation device for contributing to and/or generation of the creditworthiness indicator. Said evaluation device records statistical data concerning the direct debit orders and/or the identification numbers ID issued, preferably continuously. Further data which provide information concerning the type of purchases made and/or the location of the user can be recorded and evaluated. For example, the IP address of the user can be used in order to determine roughly his location. Furthermore, using the IP address of the internet providers used by the user, an individual with RIPE responsibility or the like can be determined. The evaluation device can use the collected statistical data to adapt the payment threshold.

For example, a user to whom, on the basis of his IP address, a group having statistically good creditworthiness is assigned, can undertake direct debit orders until his account has a negative balance of more than £2, whereas a user to whom, on the basis of his IP address, a group having poor creditworthiness is assigned, can only undertake direct debit orders up to a total payable of £1. Theoretically, the payment system 30 can entirely prevent a debit before the registration if the user is assigned to a group with very poor creditworthiness. The statistics are maintained by the evaluation device, preferably in a database, and can be analysed accordingly on first contact with the user, and used for determination of the creditworthiness indicator.

As explained above, the identification number ID can at least partially comprise or be derived from data stored in a cookie and kept in the shopper system 10. Preferably, the relevant data are stored multiple times on the shopper system 10, in order to prevent deletion of said data. For example, a plurality of cookies can be stored in the shopper system 10, wherein a first cookie is stored therein directly by the payment system 30 and a second cookie is stored there by means of the online shop 20. The payment system 30 can thus request the identification number ID directly from the shopper system 10 and compare the requested value with a value provided by the online shop 20. In order to increase security and anonymity, the identification number ID can be made available to the online shop 20 in an encoded form, so that it is not possible for the online shop 20 to make a direct allocation of the user to a particular identification number ID. As soon as the user visits the same online shop 20 once again, said shop requests the identification number ID and passes said number on to the payment system. The shopper system 10 can also be directed to a web site of the payment system 30, said web site requesting the further cookie with a further, or the same, identification number ID.

For a person skilled in the art in this field, it should be obvious that there are further possibilities for allocating the identification number ID to the shopper system 10. For example, the communication protocols on which the internet is based can be amended such that said protocols permit unambiguous conclusions about the shopper system used. Commonly used browsers employ caching of the requested web sites in order to be able to access said web sites rapidly and easily. It is necessary to provide individually cached elements with a (web) identification number so that on renewed call-up of a site by the shopper system 10, an updated version of the object provided with the identification number is requested. This request by the shopper system 10 enables the payment system 30 to identify the shopper system 10 uniquely. URLs can also be modified so that said URLs give the identification number ID or a portion thereof.

The disclosed payment service was described with the functions of the payment system 30 separate from the functions of the online shop 20. However, it readily should be understood that such payments systems may be incorporated into the operations of the online shop. For example, the operations of such an online shop may include: receiving, over a network, request information and an identifier of a shopper system, wherein the request information represents a request for transmission of specific digital content to said the shopper system, with the digital content transmission subject to a fee; further receiving information from the shopper system indicating acceptance of the fee for such digital content; storing information related to the fee in association with the shopper system identifier; monitoring a total outstanding balance of fee(s) associated with the user device identifier; transmitting a request signal for settlement of at least a part of the total outstanding purchase balance when the total outstanding fees balance exceeds a predetermined threshold amount or when the total outstanding fees over a period of time exceeds a predetermined time interval; and transmitting the requested specific digital content to said user device when the total outstanding fees balance does not exceed the predetermined threshold amount or the total outstanding fees over a period of time does not exceed the predetermined time interval.

REFERENCE SIGNS

1 Internet
10 Shopper system
20 Online shop
30 Payment system
31 Identification device
32 Interface device
33 Memory device
34 Processing device
ID Identification number
101 Step 101: payment system records the MAC address of the shopper system
102 Step 102: Is the shopper system creditworthy?
104 Step 104: The user transacts a purchase
105 Step 105: The online shop passes on an associated entry
106 Step 106: Does an account exist for the MAC address?
107 Step 107: The payment system stores the direct debit order
108 Step 108: Further purchases?
111 Step 111: Payment request
112 Step 112: Is the user paying?
113 Step 113: Block access
114 Step 114: Create account

What is claimed is:

1. A computer-implemented method for a payment system comprising the steps of:
receiving, over a network, an identifier of a user device associated with an anonymous user, an IP address presently used by the user device and information indicative of a requested item for purchase from a network-accessible merchant by the user device, wherein the information indicates a type and price of the requested item;
identifying by an evaluation device of the payment system an approximate location of the user device as a function of the IP address;
accessing a statistical database of purchase requests by the evaluation device, and generating a statistical group credit worthiness indicator based on the approximate location of the user device and the type of the requested item;
determining a projected credit worthiness indicator by the evaluation device for the user device as a function of the group credit worthiness indicator, in the absence of payment histories for the user device and the anonymous user;

transmitting an authorization signal to the network-accessible merchant for the requested item without concurrently requiring payment for the purchase when the creditworthiness indicator for the user device satisfies predetermined conditions;

monitoring a total outstanding purchase balance associated with the user device identifier; and transmitting a request signal to the user device for settlement of at least a part of the total outstanding purchase balance associated with the user device identifier if the total outstanding purchase balance will have at least one of exceeded a predetermined threshold amount, or accrued over a period of time that exceeds a predetermined time interval.

2. The computer implemented method of claim 1, wherein the determining step further comprises the step of determining whether the user device identifier is included in a maintained list of identifiers.

3. The computer implemented method of claim 2, wherein the maintained list of identifiers includes identifiers identified in association with users.

4. The computer implemented method of claim 1, wherein the receiving step further comprises the step of evaluating whether the user device has previously been provided access to the requested item.

5. The computer-implemented method of claim 1 wherein the authorization signal is generated absent registration or login to the payment system by a user associated with the user device.

6. The computer-implemented method of claim 1, wherein the authorization signal is generated absent identifying a user associated with the user device identifier.

7. The computer-implemented method of claim 1, wherein the user device identifier is a MAC address of the user device.

8. The computer-implemented method of claim 1, wherein the user device identifier is associated with a HTTP cookie stored within the user device.

9. The computer-implemented method of claim 1, wherein the network-accessible merchant transmits the item to said user device based on the authorization signal absent receipt of payment by the payment system, wherein said item comprises digital content.

* * * * *